Patented Apr. 26, 1938

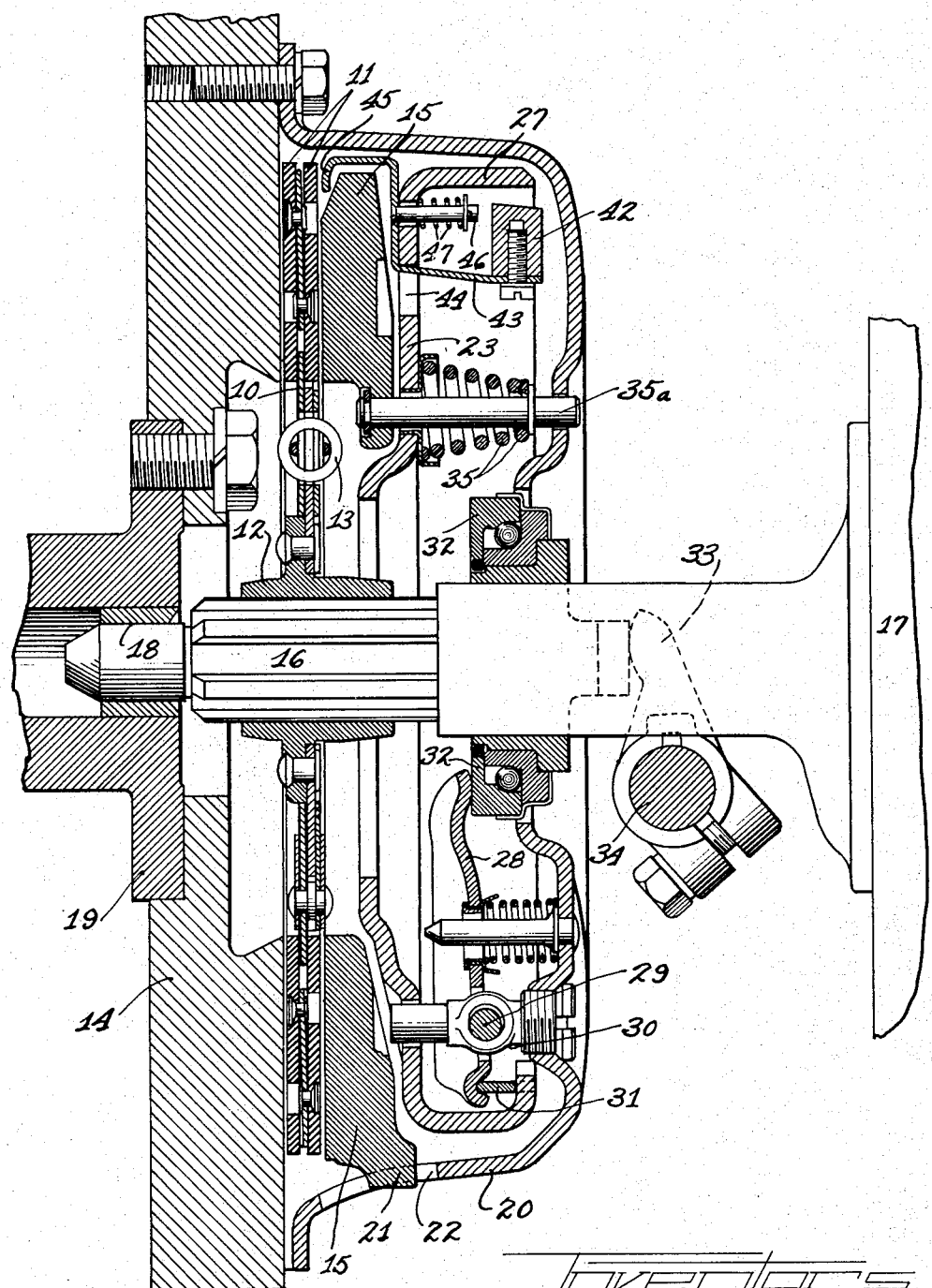

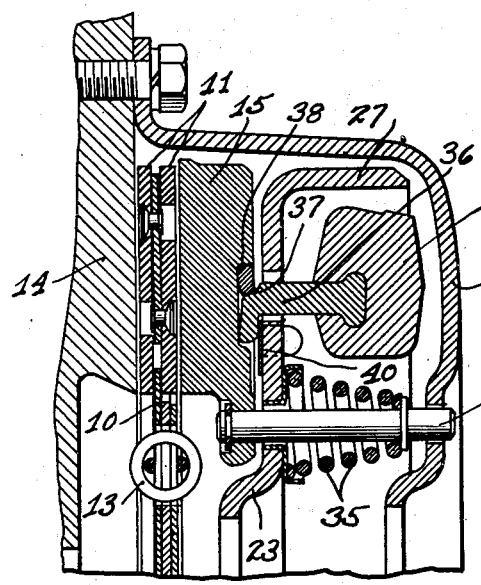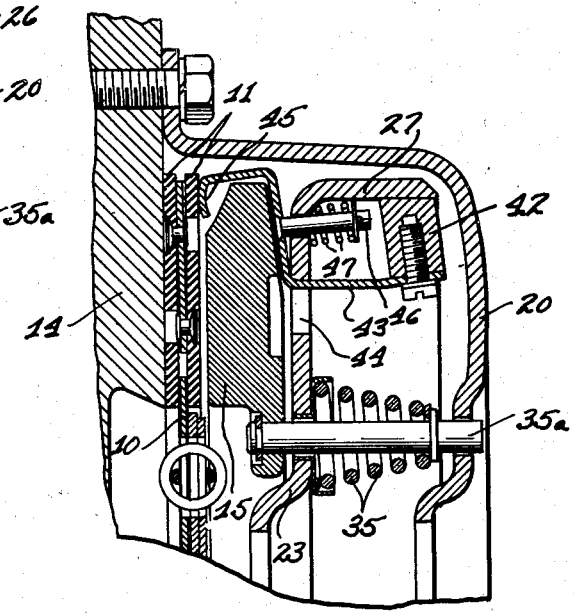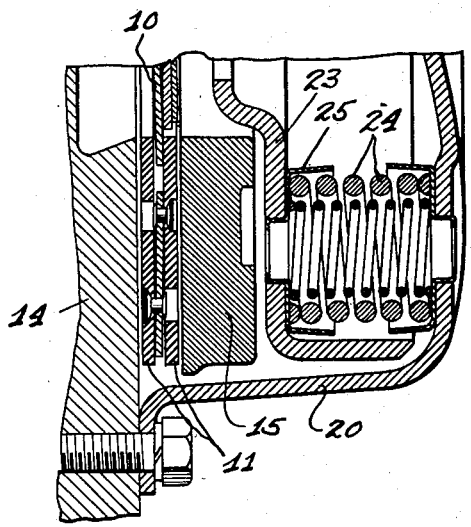

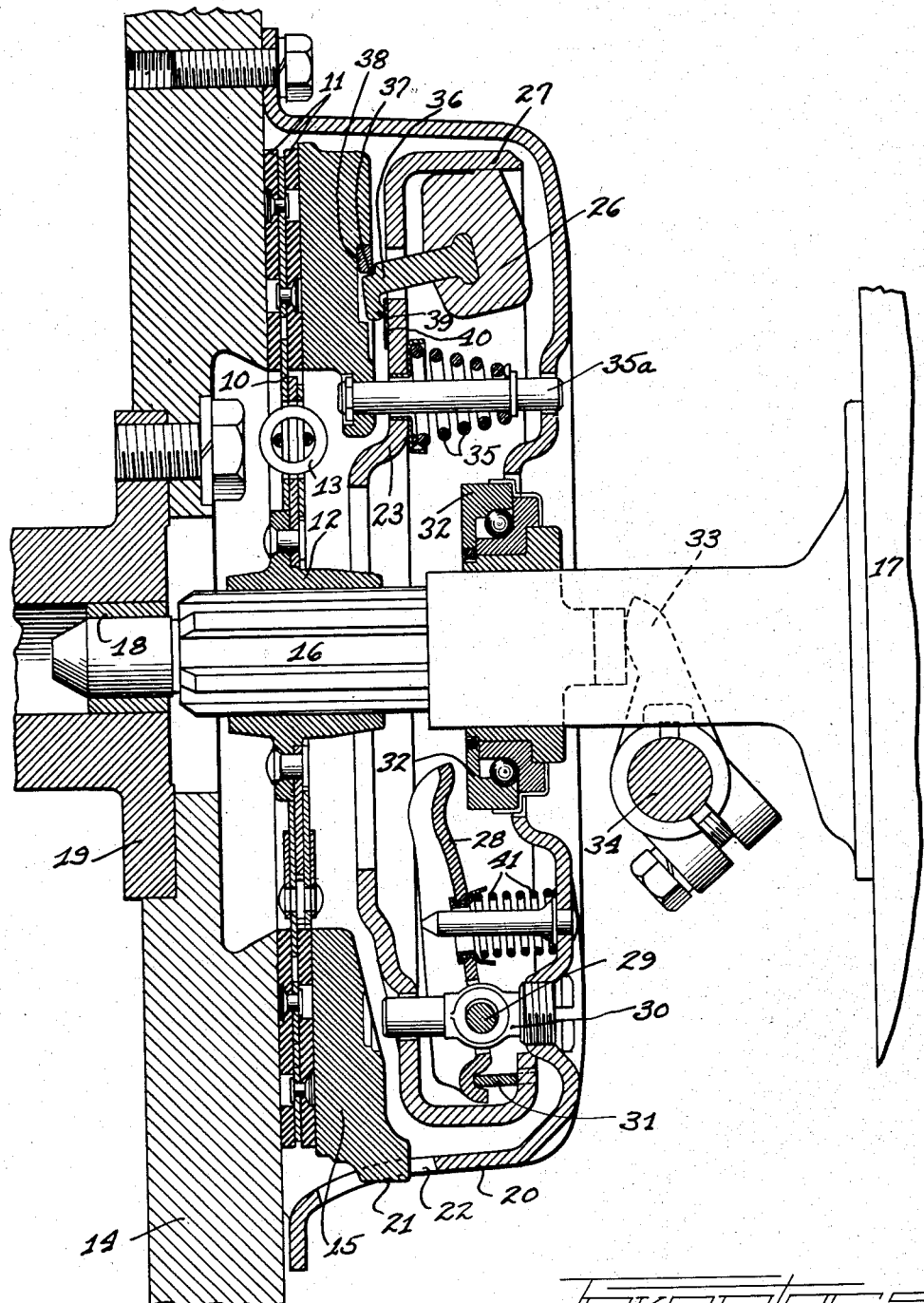

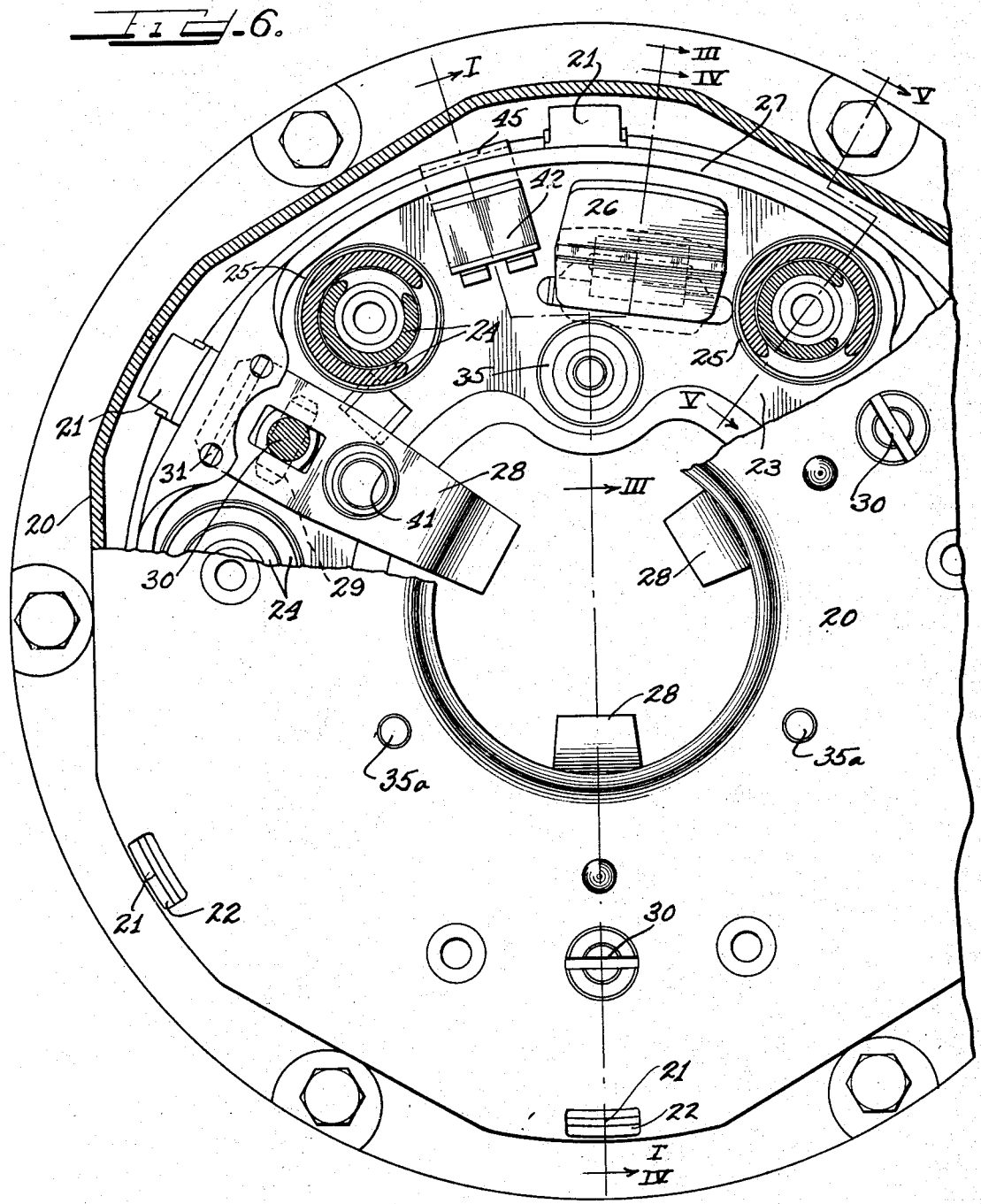

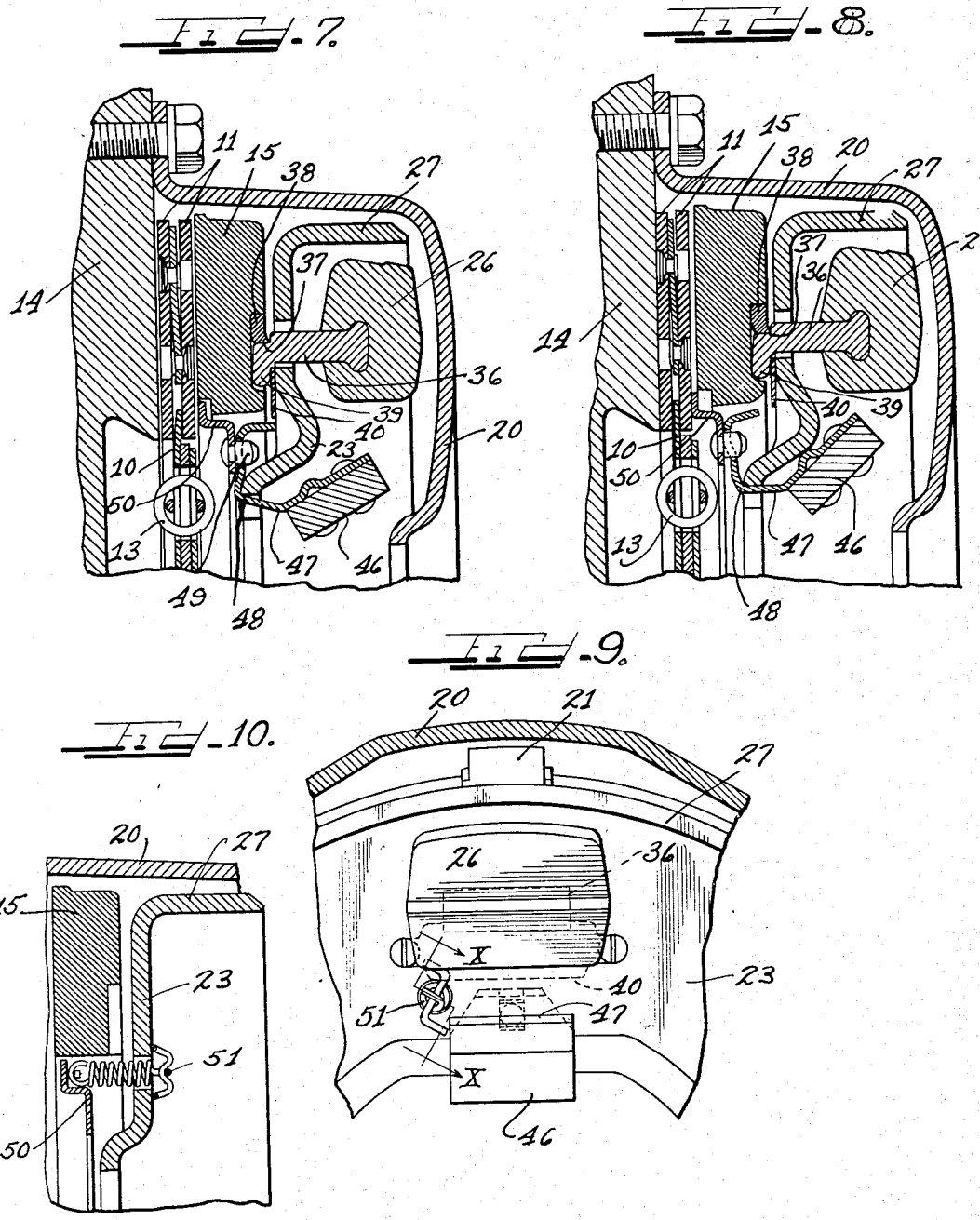

2,115,277

UNITED STATES PATENT OFFICE 2,115,277

AUTOMATIC CLUTCH

Harold Nutt and Harold V. Reed, Chicago, Ill., assignors, by mesne assignments, to Borg-Warner Corporation, Chicago, Ill., a corporation of Illinois Application February 7, 1934, Serial No. 710,046

10 Claims. (Cl. 192—105)

This invention relates to automatically operating clutches of the centrifugally energized type wherein the clutch is normally automatically engaged and disengaged as the speed of the driving member is increased or decreased through a predetermined operating range. While the illustrated embodiments of this invention have been designed to meet the specific operating requirements of automotive clutches where the clutch is disengaged at idling speeds and engages as the engine is accelerated, it will be understood that the clutch of our invention can be used for various other purposes.

It is an object of this invention to provide an improved clutch of the class described that will smoothly pick up the load on the driven member without shock due to slack or play in the driven connections even at extreme rates of acceleration of the driving member or engine. Heretofore centrifugally energized clutches have tended to be rather harsh or sudden in action at high rates of acceleration of the driving member because of the nature of the centrifugal force acting on the weights which operate the clutch pressure plate. Since the weights must swing outward from the clutch axis to respond to centrifugal force the first slight outward movement of the weights, as centrifugal force increases to a point sufficient to overcome the retractive force provided for the weights, serves to increase the centrifugal arm or radius of the weights with an increased centrifugal effect thereon that builds up further energy as the weights swing further out, the net result being that the weights act quite suddenly when once displaced from their inactive position. Since backlash or clearance is provided in a number of places in the driven connections, which clearance is cumulative, such a rapid engagement of the clutch will pick up these clearances successively to deliver quite a shock to the mechanism when the accumulated clearance is taken up suddenly. This description is equally applicable to other forms of centrifugally controlled clutches besides that disclosed herein, and the present invention relates to the provision of an auxiliary or first stage clutch engaging mechanism operating independently of and in addition to the main clutch mechanism to provide a light initial engagement of the clutch to provide a drag sufficient to take up any possible backlash in the driven connections prior to the operation of the main clutch mechanism which actually picks up the load.

It is another object of this invention to provide an improved and simplified multi-stage centrifugal clutch operating mechanism wherein the first stage weights are much smaller than those of the final stages and exert only enough torque on the driven disc prior to the engagement of the final stages to take up drive line backlash, the first stage weights operating independently of the main pressure plate so that they do not have to operate the latter, which can thus be arranged to be retracted by reasonably heavy springs to assure holding the pressure plate in its released position without danger of clutch drag due to incomplete release below a predetermined speed upon retraction of the centrifugal weights acting thereon.

It is another object of this invention to provide an improved and simplified two stage centrifugal clutch wherein the first stage operates directly against the driven disc and independently of the usual pressure plate, which plate is operated by the second stage.

Other and further important objects of this invention will be apparent from the disclosures in the specification and the accompanying drawings.

This invention (in a referred form) is illustrated in the drawings and hereinafter more fully described.

On the drawings:

Figure 1 is a central longitudinal section on the line I—I of Figure 6, with parts in elevation, showing an automatic clutch embodying one form of the present invention, the clutch being shown in its disengaged position.

Figure 2 is a fragmentary section similar to Figure 1 showing the first stage of engagement energized by an increase in rotative speed above idling.

Figure 3 is a fragmentary section on the line III—III of Figure 6, showing one second stage weight in its unenergized position.

Figure 4 is a section taken on the line IV—IV of Figure 6, showing the clutch under full automatic engagement due to a higher rotative speed than that required to produce first stage engagement.

Figure 5 is a fragmentary section on the line V—V of Figure 6 showing one group of the clutch pressure springs.

Figure 6 is a rear view of the clutch with the driven shaft and disc omitted, the housing being partly broken away to show some of the structure in section and elevation.

Figure 7 is a fragmentary section similar to that of Figure 2 showing another form of first stage mechanism in its disengaged position.

Figure 8 is a section similar to Figure 7 showing the first stage mechanism energized by centrifugal force.

Figure 9 is a fragmentary rear elevation of Figures 7 and 8 with the housing broken away.

Figure 10 is a section on the line X—X of Figure 9 showing the first stage retractor spring.

As shown:

The present invention relates to the provision of a first stage clutch engaging mechanism intended to take up back-lash in the driven train of shafts and gears and which first stage mechanism can be used with various types of secondary or power engaging mechanism that provides substantially all of the torque producing engaging pressure when a load is being transmitted through the clutch. For this reason the illustrated form of second stage mechanism is not essential to the present invention as other forms of centrifugally energized mechanism can be used, such for example as are illustrated in various prior joint or sole applications of ours.

It will be convenient to first describe the form of automatic clutch chosen to illustrate the application of the first stage mechanisms of this invention. To this end reference may first be had to Figures 3 and 4 showing the main or second stage centrifugally responsive mechanism in its disengaged and fully engaged positions, respectively. It may be noted at this point that this mechanism is fully operative as an automatic clutch without the first stage mechanisms but as so used the engagement is too sudden and takes up the backlash in the driven train with an appreciable shock that is annoyingly evident to the operator and passengers.

The second stage mechanism comprises a conventional driven disc 10 carrying friction facings 11 and mounted on a hub 12 through a torque cushioning drive including springs 13. In order to increase the smoothness of engagement, the disc 10 is slotted and distorted in the region of the friction facings 11, which latter are individually attached to the disc in such a way as to be somewhat spread apart when disengaged but compressed by the engagement of the clutch, as will be evident from a comparison of Figures 3 and 4. As far as the clutch mechanism is concerned this structure merely calls for an increase in the running clearance or range of movement of the automatic and manual controls. The disc 10 is disposed between the rear face of the engine flywheel 14 and an axially movable pressure plate 15, which plate is advanced toward the flywheel to take up running clearances and flatten out the distortions in the disc 10 thus gripping the friction facings and disc between the flywheel and pressure plate to transmit power from the flywheel to the disc 10 and its hub 12 to a driven shaft 16 which may form the driving shaft of a transmission 17. The front end of the shaft 16 is preferably supported in a pilot bearing 18 in the crankshaft flange 19 which carries the flywheel 14. The pressure plate and other rotating members are contained within a housing 20 bolted to the flywheel, and the pressure plate is constrained to revolve with the flywheel by lugs 21 engaging slots 22 in the housing 20.

The pressure plate is backed by a spring mounting ring 23, double pressure springs 24 in centering cups 25 being located between the ring and the housing, as shown in Figure 5. These springs are preloaded to a total pressure determined by the desired torque rating of the clutch, and are equivalent to the pressure springs of a normal clutch in that they determine the maximum engaging pressure which is transferred from the spring ring to the pressure plate when the several weights 26 swing outwardly into contact with the flange 27 of the spring ring, as shown in Figure 4. The spring ring is normally held in the clutch disengaged position of Figures 1 and 3 by throwout fingers 28 fulcrumed at 29 to an anchor stud 30 adjustably secured in the housing, the outer ends of the fingers having a link 31 connecting to the spring mounting ring, while the inner ends of the fingers normally contact and follow a throwout bearing 32 slidable upon a sleeve enveloping the driven shaft 16.

The throwout bearing is backed by a throwout fork 33 on a shaft 34 operable by a conventional clutch pedal (not shown), and when the bearing is held in its midposition of the illustrations, it acts through the multiplying leverage of the fingers 28 to hold the spring ring retracted against the load of the precompressed pressure springs. By shifting the throwout bearing to the right, when the clutch is disengaged, the spring ring is permitted to move to the left to cause clutch engagement at a time when the automatic mechanism would otherwise hold the clutch disengaged. By shifting the throwout bearing to the left, when the clutch is automatically engaged, the bearing acts through the fingers 28 to retract the spring ring and pressure plate, thus disengaging the clutch. The throwout bearing is normally located at its neutral position shown by positive positioning mechanism not shown in the drawings, but the operator has complete control over the clutch and can manually release or engage it at will, irrespective of the action of the automatic control.

The pressure plate, when the centrifugal weights are in their unenergized position of Figure 3, is caused to follow the spring mounting ring by retractor springs 35 on shouldered guide studs 35a carried by the pressure plate, thus holding the pressure plate in its disengaged position under such circumstances. The automatic or centrifugal engagement of the clutch is accomplished by the outward swing of the weights 26 which carry offset lugs 36 interposed between the pressure plate and spring ring, passing through slots in the latter. The lugs 36 resemble boots, the heels 37 of which form fulcrums for the weights, bearing against hardened inserts 38 on the pressure plate; while the toes 39 engage beneath the spring ring. A hardened wear plate 40 may be inserted between the toes and the spring ring to take the sliding friction at this point.

An outward movement of the weights 26, in response to increased centrifugal force, causes the toes 39 to pivot about the heels 37 to pry the pressure plate and spring ring apart, compressing the retractor springs 35. Since the spring ring is located by the fingers 28 the effect is to advance the pressure plate to the left into clutching engagement with the driven disc. When the disc distortion and running clearances have been taken up, the final movement of the weights 26 into contact with the spring ring flange 27 serves to move the spring ring slightly to the right, transferring the pressure spring load to the pressure plate and at the same time withdrawing the throwout fingers from contact with the throwout bearing, as shown in Figure 4. Light springs 41 then serve to take up any looseness in the throwout finger linkage.

The first stage mechanism of the present invention is intended to come into action at a lower speed than the second stage weights 26. As an example, if the idling speed is approximately 450 R. P. M., the main or second stage weights and their retractor springs may be designed to cause driving engagement at approximately 650 R. P. M.; the first stage weights or backlash take up being designed to operate at an intermediate speed slightly below 650 R. P. M. to allow for a higher idling speed for starting and warming up a cold engine. It is to be noted that the specific speeds mentioned are not essential and are completely under the designer's control to meet varying requirements by a suitable selection of weights, leverage and retractor spring strength.

The first stage mechanism shown in Figures 1 and 2 comprises a number of small weights 42 mounted on one end of levers 43 each fulcrumed on the edge of a slot 44 in the spring ring, the other end of the levers being bent to clear the periphery of the pressure plate and terminating in a toe 45 which is curled or dished somewhat to prevent the edges thereof from digging into the friction facing 11 when the weight and lever swings to bring the toe 45 into engagement with the driven disc. The first stage weights are much smaller than the second stage weights 26 and are capable of exerting only enough torque on the driven disc to take up the driven line backlash. The first stage weights therefore have only a very limited power and do not affect the pressure plate at all. A close comparison of Figures 1 and 2 will show that the weights 42 only partially flatten out the distorted segments of the driven disc. Each weight 42 is normally held in its retracted position of Figure 1 by a retractor stud 46 and spring 47 which spring is designed to allow the weight 42 to respond to centrifugal force at a lower rotative speed than that required to energize the second stage weights.

The above described form of first stage weights has the advantages of simplicity and economy, but the several weights act independently and therefore must be synchronized, and the friction surfaces 45 of the levers are intermittent so that there is a possibility of injury to the friction facing 11. The second form of first stage mechanism, as shown in Figures 7 to 10, overcomes these drawbacks. In this form of the invention the first stage weights 46 are carried by levers 47 fulcrumed at 48 in a notch on the inner edge of the spring ring, and the levers engage pins 49 on a small pressure ring 50 instead of bearing directly against the friction facing. The small pressure ring 50 is normally held retracted by springs 51. The second form of this invention does not differ in principle or function from that first described, and is an improvement thereover in that a continuous friction surface is provided, and the several weights are constrained to operate in unison.

In the operation of the automatic clutch of this invention, it will be understood that the second stage mechanism forms a completely operative clutch intended to carry substantially the whole load, the first stage mechanism being in a sense an auxiliary clutch engaging mechanism more sensitive than the load carrying mechanism and independent of the relatively massive pressure plate thereof. By making the first stage independent of the pressure plate, it can be made so much less powerful that its only appreciable effect is to take up the backlash in the driven train prior to the driving engagement of the main clutch, and to thus avoid the possibility of shock as the main clutch picks up the load, especially as the main clutch engagement is softened by the compression of the distorted segments of the driven disc and the torsionally yielding mounting of the disc relative to its hub. The cumulative backlash in the driven train sums up to an easily appreciable slack sufficient to develop a substantial shock if taken up suddenly under load, as it includes the spline clearances in the hub of the driven disc, the transmission and the rear axle, and the various gear clearances in the transmission and rear axle, which may individually be small, but rapidly mount due to the number of clearance spaces, which all increase with wear.

Assuming that the engine is disconnected from the transmission, and is idling under normal conditions, an increase in engine speed slightly above the usual "fast idle" provided for warming up will serve to energize the first stage or auxiliary clutch weights, swinging them outwardly into contact with the spring ring against the resistance of the first stage retractor springs. This results in the lever ends 45 or the small ring 50 being brought into contact with the driven disc with sufficient force to take up the running clearance between the disc and the flywheel, thus setting up a drag sufficient to take up the backlash in the driven connection before the engine can be accelerated to a higher speed to bring the second stage or main clutch mechanism into play to advance the pressure plate into full driving engagement with the driven disc. Even though the engine be accelerated as rapidly as possible from its idling speed, the first stage or auxiliary clutch will function sufficiently in advance of the main clutch to take up backlash in the driven connections and thus prevent the production of a shock that would ordinarily be unpleasantly noticeable to the vehicle occupants.

We are aware that many changes may be made and numerous details of construction may be varied through a wide range without departing from the principles of this invention, and we therefore do not purpose limiting the patent granted hereon otherwise than necessitated by the prior art.

We claim as our invention:

1. In combination with a centrifugally energized clutch mechanism engageable at a predetermined rotative speed including driving and driven members and a pressure plate for clamping the driven member against the driving member, an auxiliary centrifugally energized mechanism operable at a lower speed than the first mentioned clutch mechanism, and independent of the pressure plate thereof, for providing light preliminary engagement between said driving and driven members to take up backlash in the driven connections prior to the engagement of said clutch.

2. In combination with a centrifugally energized clutch mechanism engageable at a predetermined rotative speed including driving and driven members and a pressure plate for clamping the driven member against the driving member, auxiliary clutch engaging means independent of said pressure plate and automatically operable to engage the driven member at a lower speed than said clutch, whereby to provide a light preliminary engagement prior to the full engagement of said clutch.

3. The combination with a centrifugally energizable clutch engaging mechanism including driving and driven members, a pressure plate, and centrifugal weights for advancing said pressure plate into clutching engagement with said driven member, of an auxiliary clutch engaging mechanism comprising a pressure means in parallel with but independent of said pressure plate operable in response to centrifugal force to provide a light preliminary engagement between said driving and driven members.

4. The combination with a centrifugally energizable clutch engaging mechanism including driving and driven members, a pressure plate, and centrifugal weights for advancing said pressure plate into clutching engagement with said driven member, of an auxiliary clutch engaging mechanism independent of said pressure plate and centrifugally energizable in advance of the first mentioned clutch engaging mechanism to cause preliminary engagement between the driving and driven members.

5. The combination with a centrifugally energizable clutch engaging mechanism including driving and driven members, a pressure plate, and centrifugal weights for advancing said pressure plate into clutching engagement with said driven member, of an auxiliary clutch engaging mechanism comprising independently operable elements acting, when under the influence of centrifugal force acting thereupon, directly against the driven member to produce a drag thereon sufficient to take up backlash in the driven connections.

6. The combination with a centrifugally energizable clutch engaging mechanism including driving and driven members, a pressure plate, and centrifugal weights for advancing said pressure plate into clutching engagement with said driven member, of an auxiliary clutch engaging mechanism comprising a second pressure plate operable independently of the first mentioned pressure plate, and centrifugally energized means for advancing said second plate into contact with the driven member prior to the engagement thereof by the first mentioned pressure plate.

7. In a clutch including driving and driven members and a pressure plate controlled by centrifugally energized means for engaging said members through the pressure plate to transmit the load above a predetermined rotative speed of the driving member, and centrifugally operated means independent of said pressure plate for initially engaging the driven member prior to the operation of the pressure plate.

8. In a friction clutch including driving and driven members and a pressure plate carried by said driving member for engaging the driven member, centrifugally controlled mechanism having a permanent drive connection with said driving member for operating said pressure plate and auxiliary mechanism acting, when under the influence of centrifugal force, directly against the driven member for initially engaging the driven member prior to the operation of the pressure plate.

9. In an automotive vehicle clutch, the combination with a driving assembly including a driving member, a pressure plate, a spring mounting ring backing said pressure plate, of a driven member adapted to be frictionally engaged by said pressure plate, means responsive to an increase in speed of said driving member above a predetermined R. P. M. to spread said pressure plate and mounting ring apart from one another thus to establish frictional engagement between pressure plate and driven member, and means carried by said mounting ring and operative in response to rotation of said driving member at a speed less than said predetermined R. P. M. to establish a frictional driving connection between said mounting ring and said driven member independently of said pressure plate.

10. In an automotive vehicle clutch, a driving assembly including a pressure plate, a driven member having a friction facing adapted to be frictionally engaged by said pressure plate, means carried by said driving assembly and responsive to an increase in speed thereof beyond a predetermined R. P. M. to urge said pressure plate into frictional driving engagement with the driven member, and means, including a pressure member, responsive to rotation of said driving assembly at a speed less than said predetermined R. P. M. to cause frictional engagement between said pressure member and said friction facing on said driven member independently of the operation of said pressure plate, said last named means being so arranged relative to said first named means as to be rendered inoperative during the operation of said first named means when urging the pressure plate in engagement with the driven member.

HAROLD NUTT.
HAROLD V. REED.